United States Patent
Cooper et al.

(10) Patent No.: US 9,469,198 B2
(45) Date of Patent: Oct. 18, 2016

(54) SYSTEM AND METHOD FOR IDENTIFYING DAMAGED SECTIONS OF A ROUTE

(71) Applicant: General Electric Company, Schenectady, NY (US)

(72) Inventors: Jared Klineman Cooper, Melbourne, FL (US); John Charles Hounschell, II, Melbourne, FL (US); Nick David Nagrodsky, Melbourne, FL (US); Aaron Richard Mitti, Atlanta, GA (US); Ajith Kuttannair Kumar, Erie, PA (US); David Michael Peltz, Melbourne, FL (US); Brian D. Lawry, Erie, PA (US); Joseph Forrest Noffsinger, Grain Valley, MO (US)

(73) Assignee: General Electric Company, Schenectady, NY (US)

(*) Notice: Subject to any disclaimer, the term of this patent is extended or adjusted under 35 U.S.C. 154(b) by 16 days.

(21) Appl. No.: 14/489,118

(22) Filed: Sep. 17, 2014

(65) Prior Publication Data

US 2015/0081214 A1 Mar. 19, 2015

Related U.S. Application Data

(60) Provisional application No. 61/879,183, filed on Sep. 18, 2013.

(51) Int. Cl.
  *B61L 23/04* (2006.01)
  *B61K 9/10* (2006.01)
  (Continued)

(52) U.S. Cl.
  CPC . *B60L 3/10* (2013.01); *B61K 9/10* (2013.01); *B61L 23/042* (2013.01); *B61L 25/02* (2013.01); *E01C 23/01* (2013.01)

(58) Field of Classification Search
  CPC ...... B60L 3/10; B60L 15/002; B60L 15/005; B60L 2200/26; B60L 2240/10; B61L 25/02; B61L 23/042; B61L 15/0027; B61L 15/0036; B61L 15/0054; B61L 15/0063; B61L 15/0072; B61L 15/0081; B61L 2201/02; B61L 2205/00; B61L 2205/02; B61L 2205/04; B61L 2210/00; B61L 2210/02; B61L 23/005; B61L 23/24; B61L 27/00; B61L 27/0005; B61L 27/0027; B61L 27/0077; B61L 27/0083; B61L 27/0088; B61L 27/0094; B61L 3/006; B61L 3/008; B61L 3/127; B61L 2027/0044; B61L 2027/005; B61L 27/0038; B61L 23/04; B61L 23/044; B61L 23/045; B61L 23/047; B61L 23/048; B61K 9/10; B61K 9/08; E01C 23/01; B60T 13/665; B60T 15/048; B60T 7/124; B60T 7/126; B60T 1/128; B60T 8/1705; B61C 15/00; B61C 15/12; B61C 15/14; G01S 19/50
  See application file for complete search history.

(56) References Cited

U.S. PATENT DOCUMENTS 5,579,013 A * 11/1996 Hershey ............... B61K 9/08
  342/357.4
5,987,979 A * 11/1999 Bryan ................... B61K 9/08
  33/1 Q (Continued)

FOREIGN PATENT DOCUMENTS

WO 2013032322 A1 3/2013

OTHER PUBLICATIONS

PCT Search Report and Written Opinion issued in connection with corresponding Application No. PCT/US2014/056219 on Dec. 19, 2014.

*Primary Examiner* — Stephen Holwerda
(74) *Attorney, Agent, or Firm* — GE Global Patent Operation

(57) ABSTRACT

A method and system for examining velocity differences in a vehicle speed of a vehicle and the angular speed of the axles and/or wheels of the vehicle system traveling along a route to determine if the route is damaged and/or to identify the location of the potentially damaged section of the route. The differences may represent wheel creeps of the vehicle system.

22 Claims, 6 Drawing Sheets

(51) Int. Cl.
   *B60L 3/10* (2006.01)
   *E01C 23/01* (2006.01)
   *B61L 25/02* (2006.01)

(56) References Cited

U.S. PATENT DOCUMENTS

| | | | | |
|---|---|---|---|---|
| 6,152,546 A | * | 11/2000 | Daigle | B60K 28/16 303/151 |
| 6,668,239 B1 | * | 12/2003 | Gilbert | B61K 9/08 34/342 |
| 7,882,742 B1 | * | 2/2011 | Martens | G01N 29/07 73/632 |
| 9,108,640 B2 | | 8/2015 | Jackson | |
| 2002/0056398 A1 | * | 5/2002 | Bachtiger | B61K 9/08 105/157.1 |
| 2005/0212666 A1 | * | 9/2005 | Kawazoe | B60W 30/12 340/436 |
| 2007/0001629 A1 | * | 1/2007 | McGarry | B60L 3/10 318/52 |
| 2007/0152107 A1 | * | 7/2007 | LeFebvre | B61K 9/00 246/169 R |
| 2008/0105791 A1 | | 5/2008 | Karg | |
| 2011/0285518 A1 | * | 11/2011 | Gordon | B60W 40/06 340/425.5 |
| 2012/0199700 A1 | | 8/2012 | Li et al. | |
| 2012/0209471 A1 | | 8/2012 | Guenther et al. | |
| 2014/0277824 A1 | * | 9/2014 | Kernwein | B61K 9/00 701/1 |

\* cited by examiner

SYSTEM AND METHOD FOR IDENTIFYING DAMAGED SECTIONS OF A ROUTE

CROSS-REFERENCE TO RELATED APPLICATIONS

This application claims priority to U.S. Provisional Application No. 61/879,183, filed 18 Sep. 2013, which is hereby incorporated by reference herein in its entirety.

FIELD

Embodiments of the subject matter described herein relate to examining routes traveled by vehicles to identify and/or locate damaged sections of the route.

BACKGROUND

Routes that are traveled by vehicles may become damaged over time with extended use. For example, tracks on which rail vehicles travel may become damaged and/or broken. A variety of known systems are used to examine rail tracks to identify where the damaged and/or broken portions of the track are located. For example, some systems use cameras, lasers, and the like, to optically detect breaks and damage to the tracks. The cameras and lasers may be mounted on the rail vehicles, but the accuracy of the cameras and lasers may be limited by the speed at which the rail vehicles move during inspection of the route. As a result, the cameras and lasers may not be able to be used during regular operation (e.g., travel) of the rail vehicles in revenue service.

Other systems use ultrasonic transducers that are placed at or near the tracks to ultrasonically inspect the tracks. These systems may require very slow movement of the transducers relative to the tracks in order to detect damage to the track. When a suspect location is found by ultrasonic inspection, a follow-up manual inspection may be required for confirmation of potential defects using transducers that are manually positioned and moved along the track and/or are moved along the track by a relatively slower moving inspection vehicle. Inspections of the track can take a considerable amount of time, during which the inspected section of the route may be unusable by regular route traffic.

Other systems use wayside devices that send electric signals through the tracks. If the signals are not received by other wayside devices, then a circuit that includes the track is identified as being open and the track is considered to be broken. These systems are limited at least in that the wayside devices are immobile. As a result, the systems may be unable to inspect large spans of track and/or a large number of devices must be installed in order to inspect the large spans of track.

Other systems use human inspectors who move along the track to inspect for broken and/or damaged sections of track. This manual inspection can be slow and prone to errors.

BRIEF DESCRIPTION

In an embodiment of the inventive subject matter, a method to identify damaged sections of a route is provided. The method includes monitoring wheel creeps for plural wheels of a vehicle as the vehicle travels along the route, examining the wheel creeps to determine when the wheel creeps exceed a designated, non-zero threshold, determining if the wheel creeps exceed the threshold when the wheels traveled over a common location along the route, and identifying a damaged section of the route at the common location when the wheel creeps exceed the threshold when the corresponding wheels traveled over the common location.

In an embodiment, a system (e.g., that identifies damaged sections of a route) includes a monitoring device configured to determine a first velocity difference between a moving speed of a vehicle traveling along a route and a first rotational speed of a first wheel of the vehicle traveling of the vehicle along the route. The system also includes a route inspection device configured to identify a damaged section of the route based at least in part on the first velocity difference of the first wheel.

In an embodiment, a method (for identifying damages sections of a route using a moving vehicle) includes determining a first velocity difference between a moving speed of a vehicle traveling along the route and a first rotational speed of a first wheel of the vehicle traveling along the route. The method also includes identifying a damaged section of the route based at least in part on the first velocity difference of the first wheel.

BRIEF DESCRIPTION OF THE DRAWINGS

The subject matter described herein will be better understood from reading the following description of non-limiting embodiments, with reference to the attached drawings, wherein below.

DETAILED DESCRIPTION

Figure 1:
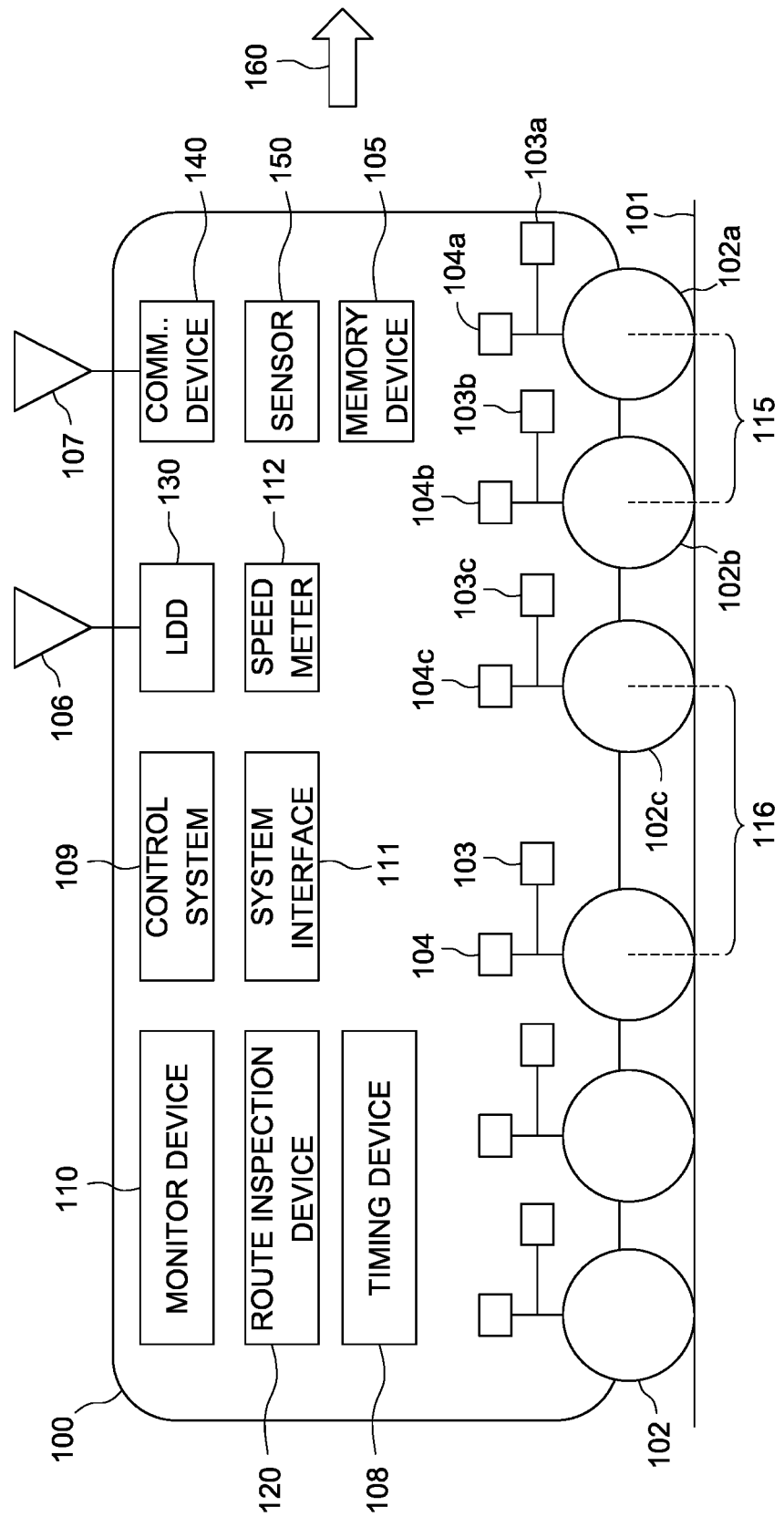
FIG. 1 is a schematic illustration of an embodiment of a vehicle system.

Embodiments of the inventive subject matter described herein relate to identifying damaged sections of a route by monitoring differences between the rotational speeds of one or more wheels and moving speeds of a vehicle system along a route. In one aspect, the damaged sections may be identified by monitoring changes in wheel creep of the vehicle system among several wheels of the vehicle system. The term "vehicle system" can refer to a single vehicle (e.g., a locomotive, an automobile, an off-highway vehicle that is not designed or permitted for travel on public roads, or the like) or a combination of two or more vehicles that are mechanically coupled with each other to travel along the route (e.g., a vehicle consist such as a rail vehicle consist or train).

Wheel creep for a wheel includes a difference between an angular velocity of the wheel and a moving velocity of the vehicle system along a route. Wheel creep can develop when a reduction of friction or traction between a wheel and the route occurs. A reduction of friction or traction can occur for numerous reasons, such as when the route has debris or other materials on the route (e.g., rain, ice, oil, decomposing leaves, or the like), when the route is damaged (e.g., a rail that is broken through an entirety of a cross-section of the rail, a rail that is cracked, engine burn in a rail, etc.), or the like.

Unlike other causes of the traction loss on the route surface, reduction in traction that is caused by damage to the route can affect several wheels as the different wheels travel over the location in the route that is damaged. For example, the route damage can create a sudden spike or abrupt increase in the wheel creep. The angular velocity in the wheels can suddenly and/or temporarily increase as the various wheels travel over the damaged section while the moving speed (e.g., linear speed) of the vehicle system along the route does not change or changes relatively little. Consequently, the wheel creep for a wheel can suddenly and/or temporarily increase when the wheel travels over the damaged section of the route. The vehicle system can be configured to monitor the wheel creep of several wheels of the vehicle system to determine a damaged route location.

Once a location of the damaged section of the track is identified, the vehicle system may send one or more messages and/or instructions to a remote system (e.g., off board the vehicle system), to a predetermined location within the vehicle system, to one or more other vehicle systems, or the like. In at least one embodiment, once the one or more messages are received by the remote system, the remote system may transmit instructions to the vehicles system or other vehicle system such as a slow order proximate to the damage section of the track identified, communicate to other vehicle systems proximate to the damaged section of the track identified, or the like. Optionally, the type of instructions sent by the remote system may be based on the type and/or priority of the vehicle system.

At least one technical effect of various embodiments described herein may include the reduction of independent track inspection equipment traveling along routes concurrently with one or more vehicle system.

FIG. 1 is a schematic illustration of an embodiment of a vehicle system 100. The vehicle system 100 may represent a propulsion-generating vehicle that is capable of generating tractive effort to propel the vehicle system 100 along a route 101. For example, the vehicle system 100 may represent a rail vehicle (e.g., a locomotive), another off-highway vehicle (e.g., a vehicle that is not designed or permitted for travel on public roadways), an automobile, or another type of vehicle. Optionally, the vehicle system 100 may represent multiple vehicles mechanically connected together. For example, the vehicle system 100 may include the vehicle shown in FIG. 1 coupled with one or more other propulsion-generating vehicles and/or one or more non-propulsion-generating vehicles (e.g., railcars) for traveling together along the route 101, such as in a vehicle consist, rail vehicle consist, or the like.

The vehicle system 100 includes several components that operate to monitor velocities of the vehicle system 100 and wheels of the vehicle system 100, and/or to monitor the wheel creep of the vehicle in order to identify and/or confirm damaged sections of the route 101 as the vehicle system 100 moves or travels along the route 101. These components may communicate with each other via wired and/or wireless connections. It should be noted, that the components shown and described in FIG. 1 may be duplicated and/or included throughout multiple vehicles within the vehicle system 100. For example, each of the components may be within one or more propulsion-generating vehicles that are mechanically connect together to form the vehicle system 100. In another example, each of the components and/or a subset of the components may be within one or more propulsion-generating or non-propulsion-generating vehicles mechanically connected with each other to form the vehicle system 100.

The vehicle system 100 includes a control system 109. The control system 109 controls operations of the vehicle system 100 and may include or represent hardware circuits or circuitry that include and/or are connected with one or more logic based devices, such as one or more processors, microprocessors, controllers, microcontrollers, or other logic based devices (and/or associated hardware, circuitry, and/or software stored on a tangible and non-transitory computer readable medium or memory).

The control system 109 may communicate with a system interface 111. The system interface 111 may include one or more monitors, displays, keyboards, touchscreens, speakers, microphones, a graphical user interface overlaid on a display, or the like. The control system 109 may receive inputted commands from the system interface 111 to control electric current supplied to one or more motors 104 (e.g., traction motors) of the vehicle system 100. The one or more motors 104 are each coupled with axles and/or wheels 102 of the vehicle system 100. The powered motors 104 rotate the axles and/or wheels 102 to propel the vehicle system 100 along the route 101.

The system interface 111 may be used by an operator to monitor the operation of the vehicle system 100 and/or for reporting the detection of a damaged section of the route 101 by a route inspection device 120. In an embodiment the system interface 111 may be used by an operator to receive alerts or notifications by an off-board system regarding damaged sections of the route 101.

A location determining device 130 operates to receive signals from one or more off-board sources that represent locations, moving speeds, and/or headings of the vehicle system 100. For example, the location determining device 130 may include a receiver, antenna 106, and associated circuitry for receiving wireless signals representative of the location, speed, and/or heading of the vehicle system 100. The signals may be received from satellites (e.g., global positioning system (GPS) signals transmitted from GPS satellites), from wayside devices, from other vehicle systems, from cellular towers or stations, from transponders disposed alongside the route 101, from RFID tags disposed alongside the route 101, or the like. The location determining device 130 and/or the control system 109 may determine the location of the vehicle system 100 based from the received signals. Optionally, the location determining device 130 may be connected to or in communication with a memory device 105 to store the vehicle system 100 location information.

The memory device 105 of the vehicle system 100 may include or represent one or more memories (e.g., a tangible and non-transitory computer readable memory, such as a computer hard drive, EEPROM, ROM, RAM, or the like) having a table, list, database, or other memory structure used to store information used in conjunction with performing one or more of the methods described herein.

The vehicle system 100 may include a communication device 140. The communication device 140 may communicate with one or more other vehicle systems and/or other remote locations that are off-board the vehicle system 100. The communication device 140 may include or represent an antenna 107 (along with associated transceiver hardware circuitry and/or software applications) for wirelessly communicating with other vehicle systems and/or remote locations. Optionally, the communication device 140 may communicate via one or more wired connections, such as a multiple unit (MU) cable, a trainline, an electrically controlled pneumatic (ECP) brake line, or the like.

The vehicle system 100 may include one or more angular speed devices 103 (e.g., tachometer, Hall Effect sensor system, optical sensor, or the like). The angular speed devices 103 are configured to measure angular velocities of the axles and/or wheels 102 as the vehicle system 100 is travelling along the route 101. The angular speed devices 103 may communicate the angular velocities of the axles and/or wheels 102 to a monitor device 110. Optionally, the angular speed devices 103 may communicate the angular velocities of the axles and/or wheels 102 to the system interface 111 to display or notify the operator of the angular velocity measurements. In an embodiment the angular speed devices 103 may communicate the angular velocities of the axles and/or wheels 102 to an off-board system using the communication device 140. The off-board system may be a central dispatch facility, an automated scheduling system, an exchange server, or the like.

The vehicle system 100 may include one or more speed sensors, such as speed meters 112 (e.g. speedometer, tachometer, or the like). The speed meter 112 are configured to measure a moving velocity of the vehicle system 100 as the vehicle system 100 is travelling along the route 101. The speed meter 112 may communicate the moving velocity of the vehicle system 100 to the monitor device 110.

In at least one embodiment, the speed meter 112 receives positional measurements from the location determining device 130 (e.g., GPS). Based on a change in positional measurements over a predetermined time period, the speed meter 112 may determine the moving velocity of the vehicle system 100. Optionally, the speed meter 112 and the location device 130 may be the same device.

Additionally or alternatively, the speed meter 112 may receive optical data corresponding to external from a sensor 150 (e.g., optical sensor) to determine the moving velocity of the vehicle system 100.

The vehicle system 100 may include one or more sensors 150. The sensors 150 may be configured to measure the external environment of the vehicle system 100 (e.g., optical sensors, thermal sensors, motion detectors, proximity sensors, or the like), physical characteristics of the vehicle system 100 (e.g., accelerometers, altimeter, thermocouples, gyroscopes, or the like), or physical characteristics of the route 101 (e.g., optical monitoring sensor, microphones, acoustic detectors, signal generators, or the like).

The vehicle system 100 includes the monitor device 110. The monitor device 110 determines the wheel creep for one or more wheels 102 of the vehicle system 100. The monitor device 110 may be configured to calculate the wheel creep by acquiring the angular velocities of the axles and/or wheels 102 from one or more angular speed devices 103 and the moving velocity of the vehicle system 100 from the speed meter 112. Once the monitor device 110 determines the wheel creep, the monitor device 110 may output the wheel creep measurements to a route inspection device 120. Optionally, the monitor device 110 may receive, obtain, or acquire timing details or time stamps corresponding to the angular velocities of the wheels 102 and the velocity of the vehicle system 100 from a timing device 108. Additionally or alternatively, the monitor device 110 may communicate the wheel creep measurements to the system interface 111 to display the wheel creep measurement to the operator. Optionally, the monitor device 110 may output or transmit the wheel creep measurements to an off-board system by interfacing or communicating with the communication device 140.

The vehicle system 100 includes the route inspection device 120. The route inspection device 120 may be configured to analyze the output of the monitor device 110 (e.g., the wheel creep measurements), the timing device 108 (e.g., timing details of the angular velocities, timing details of the velocity of the vehicle system 100), and designated non-zero thresholds to determine locations of potentially damaged sections of the route 101. The route inspection device 120 may communicate said locations to the system interface 111 to display a notification to the operator of said potentially damaged sections of the route 101. In at least one embodiment the route inspection device 120 may communicate or transmit said locations to an off-board system (e.g., a central dispatch facility, a scheduling system, an exchange server for a central database, one or more other vehicle systems, or the like) by interfacing or communicating with the communication device 140.

Optionally, the route inspection device 120 may output or communicate a notification or alert to the control system 109 of the potentially damaged section of the route 101. Upon receipt of said notification, the control system 109 may take precautionary actions such as decreasing velocity or stopping the vehicle system 100.

Additionally or alternatively, upon receipt of the notification, the control system 109 may instruct the monitor device 110 to measure the wheel creep from additional wheels 102 from the vehicle system 100. For example, the monitor device 110 may calculate the wheel creep corresponding to the wheel 102a based on measurements from the angular speed device 103a and the speed meter 112. Based on the wheel creep measurements from the monitor device 112, the route inspection device 120 may determine that a location of the route 102 is potentially damaged. The route inspection device 120 may output an alert to the control system 109. Upon receipt of the alert, control system 109 may instruct the monitor device 110 to measure the will creep for the wheel 102c. In at least one embodiment, the control system 109 may instruct the monitor device 110 to measure the wheel creep from an alternative vehicle (e.g., propulsion-generating vehicle, non-propulsion-generating vehicle) within the vehicle system 100.

The vehicle system 100 includes the timing device 108. The timing device 108 may include or represent hardware circuits or circuitry that include and/or are connected with one or more logic based devices, such as processors, microprocessors, controllers, microcontrollers, or other logic based devices (and/or associated hardware, circuitry, and/or software stored on a tangible and non-transitory computer readable medium or memory). The timing device 108 may interface with several components or systems within the vehicle system 100 in order to synchronize or coordinate actions within the vehicle system 100. The timing device 108 may be integrated or combined with the control system 109. The timing device 108 may interface with the angular speed devices 103 to create time stamps or time details for the respective angular velocity measurements of the axles and/or wheels 102. Further, the timing device 108 may interface with one or more sensors 150 to assign timing details or time stamps to the sensor 150 measurements. Additionally, the timing device 108 may interface with the route inspection device 120.

Figure 2:
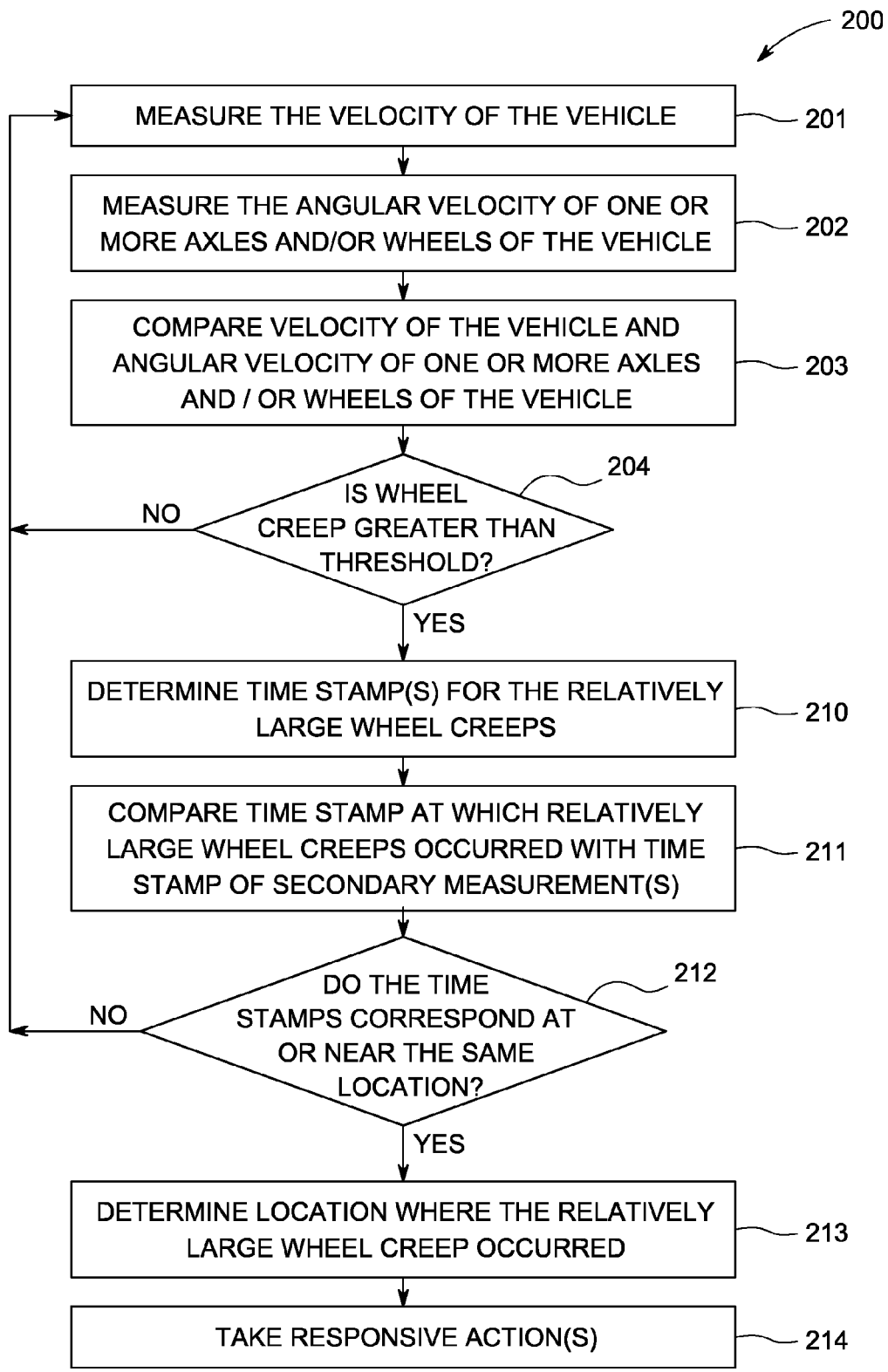
FIG. 2 illustrates a flowchart of a method for identifying damaged sections of a route using a wheel creep measurement of the vehicle system shown in FIG. 1.

With continued reference to FIG. 1, FIG. 2 illustrates a flowchart of a method 200 to identify damaged or potentially damaged sections of the route 101. The method 200 may be used to create a software algorithm, package, or system that can be used to direct one or more hardware circuits or circuitry to perform the actions described herein. For example, the operations of the method 200 may represent actions to be performed by one or more circuits that include or are connected with one or more processors, microprocessors, controllers, microcontrollers, Application Specific Integrated Circuits (ASICs), Field-Programmable Gate Arrays (FPGAs), or other logic-based devices that operate using instructions stored on a tangible and non-transitory computer readable medium (e.g., a computer hard drive, ROM, RAM, EEPROM, flash drive, or the like), such as software, and/or that operate based on instructions that are hardwired into the logic of the. At least one technical effect of one or more methods described herein include the detection and/or identification of damaged sections or potentially damaged sections of a route using differences between moving velocity of a vehicle system and angular velocities of wheel in the vehicle system.

One or more methods may (i) determine, using one or more processors, a first velocity difference between a moving speed of a vehicle traveling along a route in the first rotational speed of the first wheel of the vehicle traveling along the route, and (ii) identify, using the one or more processors, a damaged section of the route based at least in part on the first velocity difference of the first wheel.

Additionally or alternatively, one or more methods may (i) monitor wheel creeps for a plurality of wheels of a vehicle as the vehicle travels along a route, (ii) examine the will creeps to determine when the wheel creeps exceeded designated, non-zero threshold, (iii) determine if the wheel creeps exceeded the threshold when the corresponding wheels traveled over a common location along the route, and (iv) identify a damaged section of the route at the common location when the will creeps exceed the threshold when the corresponding wheels traveled over the common location.

At 201, the moving velocity or speed of the vehicle system is obtained. For example, in the vehicle system 100, the velocity of the vehicle system 100 may be measured by the speed meter 112 and/or the location determining device 130.

At 202 the angular velocity of the axles and/or wheels of the vehicle system is obtained. For example, in the vehicle system 100, the angular velocity of one or more axles and/or wheels 102 may be measured by the angular speed device 103 of the vehicle system.

At 203, the velocity of the vehicle and the angular velocity of one or more axles and/or wheels of the vehicle are compared. As described above, the wheel creep may represent a difference between the vehicle velocity and the angular velocity of the wheel of the vehicle. In the vehicle system 100, the velocity of the vehicle system 100 is measured by the speed meter 112 and communicated, transmitted, or sent to the monitor device 110. Also, in the vehicle system 100, the angular velocity measured by the angular speed devices 103 of one or more axles and/or wheels 102 are communicated, transmitted, or sent to the monitor device 110. The monitor device 110 of the vehicle system 100 calculates or compares the vehicle system 100 velocity and angular velocity measurements to determine a wheel creep corresponding to the one or more axles and/or wheels of the vehicle. Once the wheel creep is determined, the monitor device 110 may output the wheel creep to the route inspection device and/or the control system 109.

At 204, the wheel creep is compared with a determined, non-zero threshold. Wheel creep can occur without damage to the route, if a monitoring system measures any wheel creep as a possible damaged section of the route the system may create numerous false positives for detected route damage. As described above, a damaged section of the route will cause a sudden spike in wheel creep. A non-zero threshold may be used to decrease the possibility of a false positive and increase the likelihood the wheel creep is caused by a damaged section of the rail. Upon receipt of the wheel creep measurements from the monitor device 110, the route inspection device 120 may compare, analyze, or contrast the wheel creep measurements with the determined non-zero threshold. The non-zero threshold may be a predetermined value stored on the memory device 105. Optionally, the determined non-zero threshold may be received by the vehicle system 100 from the operator using the system interface 111. Optionally, the determined non-zero threshold may be received by the vehicle system 100 from an off-board system through the communication device 140.

Optionally, the determined non-zero threshold may be based on a moving or rolling average of the wheel creep measurements from the monitor device 110. For example, the control system 109 may determine the determined non-zero threshold based by averaging the wheel creep measurements received from the monitor device 110. The control system 109 may dynamically calculate the non-zero threshold once an additional creep measurement is received from the monitor device 110. Optionally, the determined non-zero threshold may be a percentage (e.g., fifty percent, one hundred percent, two hundred percent) above the average will creep measurements determined by the control system 109.

Additionally or alternatively, the control system 109 may determine the determined non-zero threshold based by averaging the wheel creep measurements received by the monitor device 110 based on predetermined time periods. For example, the visual system 109 may determine the determined non-zero thresholds based by averaging a group of wheel creep measurements received from the monitor device 110 at each predetermined time period. For each new predetermined time period, the controller 109 may replace the determined non-zero threshold with the average wheel creep measurements from the subsequent group corresponding to the new predetermined time period.

If the wheel creep is greater than the determined non-zero threshold, then at 210, time stamps are determined for the relative large wheel creeps. For example, in the vehicle system 100, the timing device 108 may output the timing specifications of the angular speed measurements of the axle and/or wheel and the vehicle system 100 velocity measurements to the monitor device 110. Additionally or alternatively, the timing device 108 may output the timing specifications of the angular speed measurements of the axles and/or wheels 102 and the moving velocity measurement of the vehicle system 100 to the route inspection device 120.

At 211, the time stamps at the relatively large wheel creep is compared with a secondary measurement. The secondary measurement may be one or more wheel creep measurements from respectively one or more wheels of the vehicle. Additionally or alternatively, the secondary measurement may be one or more wheel creep measurements from respectively one or more wheels of other vehicles within the vehicle system 100 (e.g., propulsion-generating vehicles, non-propulsion-generating vehicles). Optionally, the secondary measurement may be from a sensor (e.g., an accelerometer, optical sensor, microphone, acoustic sensor, electrical probe, or the like) measuring the vehicle or the route as the vehicle travels along the route.

In the vehicle system 100, the route inspection device 120 may receive wheel creep measurements and time stamps from the monitor device 110 for the wheels 102a, 102b, and 102c. Optionally, the route inspection device 120 may receive a single wheel creep measurement and time stamp from the monitor device 110 (e.g., corresponding to the wheel 102a) and a secondary measurement and time stamp from the sensor 150 (e.g., accelerometer, optical sensor, acoustic sensor, microphone, electrical probe, or the like). Once the measurements are received, the route inspection device 120 may compare the measurements at the corresponding time stamps.

At 212, the method 200 determines whether the time stamps from the relatively large wheel creep and secondary measurement correspond to the same location. For example, the route inspection device 120 may compare the location of the relatively large wheel creep and the secondary measurement. If the locations are the same, the route inspection device 120 may determine that the relatively large wheel creep and secondary measurement correspond to the same location.

Optionally, the inspection device 120 may determine that the relatively large wheel creep and the secondary measurement correspond to the same location if the locations are within a predetermined distance. For example, if the distance between the locations are less than a displacement 115 between the wheels 102. Additionally or alternatively, the route inspection device 120 may determine whether the locations of the relatively large wheel creep and the secondary measurement are near the same location based on a difference in the time stamps based on the forward velocity of the vehicle system 100 as described below.

At 213, the location is determined where the relatively large wheel creep occurred on the route. In the vehicle system 100, the route inspection device 120 may determine the location be comparing the time stamp of the wheel creep with the location of the vehicle system 100 stored on the memory device 105 received from the location determining device 130.

At 214, responsive actions are initiated based on the identification and/or location of possible damaged sections of the route 101. In an embodiment the responsive action may include reporting, communicating, sending, or transmitting to an off-board location (e.g., a central dispatch facility, a scheduling system, an exchange server for a central database, one or more other vehicles concurrently traveling on the route or the like) the location of the damaged section of the route. Additionally or alternatively, the responsive action may be to instruct the off-board location to schedule an inspection of the damaged section of the route 101, schedule repair of the damaged section of the route 101, modify a schedule of one or more other vehicles, and/or notify the one or more other vehicles of the damaged section of the route 101.

For example, the control system 109 may report the location of the possibly damaged section of the route 101 to the off-board location. The off-board location, in response to the report, may transmit a slow order (e.g., instructing vehicles to reduce speed) at or near the location of the possibly damaged section of the route 101, send messages to one or more other vehicle systems along the same route 101 to investigate or corroborate the measurements (e.g., perform wheel creep measurements at the reported location) of the damaged section of the route 101 and report results to the off-board location, or the like.

Optionally, the responsive action may be for the control system 109 to instruct or command the vehicle to change velocity after identifying the damaged section of the route. Optionally, the responsive action may be to report, communicate, or notify the operator of the vehicle regarding the damaged section of the route after the damaged section has been identified.

Figure 3:
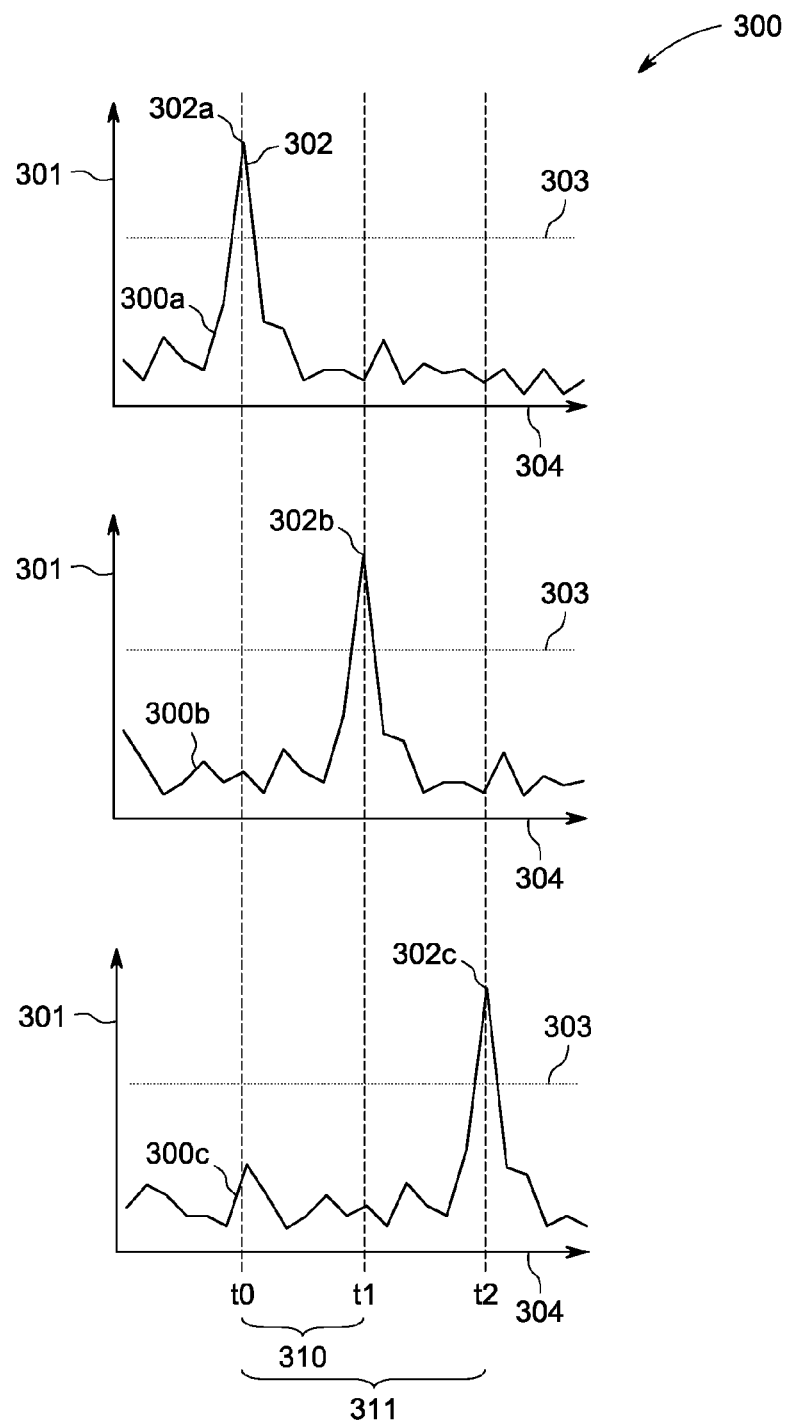
FIG. 3 is a graphical representation of wheel creep measurements from several wheels of the vehicle system shown in FIG. 1 traveling along a route.

With continued reference to FIG. 1, FIG. 3 shows velocity differences 300 of the vehicle system 100. The velocity differences 300 (e.g., 300a, 300b, 300c) represent differences between the angular velocities of three wheels 102 (e.g., 102a, 102b, 102c) of the vehicle system 100 and a moving velocity of the vehicle system 100. For example, the velocity differences 300 may increase when the angular velocity of a wheel is greater than or increasing faster than the moving velocity of the vehicle system 100 along the route 101. In another example, the velocity difference 300 may decrease when the angular velocity is closer or approximately the same with the moving velocity of the vehicle system 100. The velocity differences 300 are shown alongside horizontal axes 304, representative of time, and vertical axes 301 representative of the value, magnitude, or percentage of the velocity differences. The vehicle system 100 is traveling along the route 101 in the direction of an arrow 160 (shown in FIG. 1).

In at least one embodiment, the route inspection device 120 may monitor the velocity differences of the moving velocity of the vehicle system 100 and the angular velocity of the axles and/or wheels 102 to determine whether the velocity differences are greater than a determined non-zero threshold 303. The route inspection device 120 may identify three velocity difference peaks 302 (e.g., 302a, 302b, 302c) that are greater than the designated non-zero threshold 303 at $t_0$, $t_1$, and $t_2$.

Once identified, the route inspection device 120 may determine whether the velocity difference peaks 302 occurred at the same location of the route 101. The route inspection device 120 may calculate, determine, or measure the data provided by the monitor device 110 to determine if the velocity difference peaks 302 correlate with the times at which the different wheels traveled over the same location of the route 101. If the peaks correlate, then that location may be damaged or broken, which can cause the angular velocity of the wheels to increase more than the moving velocity. One or more equations of motion may be used to determine if the peaks correlate to the same location in the route:

$$v = \frac{\Delta d}{\Delta t} \qquad \text{(Equation \#1)}$$

For example for Equation #1, may be used by the route inspection device 120 to compare a calculated moving velocity with the moving velocity measured by the vehicle system 100. In an embodiment, variable 'v' may represent the calculated moving velocity of the vehicle system 100. Variable '$\Delta d$' represents a measured distance between the wheels 102 (e.g., 102a, 102b, 102c) of the vehicle system 100. And variable '$\Delta t$' represents a measured amount or passage of time between the velocity difference peaks 302 (e.g., 302a, 302b, 302c). The route inspection device 120 may determine if the difference between the calculated (e.g., v) and measured moving velocities of the vehicle system 100 is within a predetermined threshold. If the calculated and measured moving velocities are within the predetermined threshold, the route inspection device 120 may determine that the velocity peaks 302 occurred at the same location of the route 101 and the route 101 is potentially damaged at said location.

$$\Delta d = v \cdot \Delta t \quad \text{(Equation \#2)}$$

For example for Equation #2, may be used by the route inspection device 120 to compare a calculated distance between the wheels 102 of the vehicle system 100 with the distance measured by the vehicle system 100. In an embodiment, variable 'Δd' may represent a calculated distance between the wheels 102 (e.g., 102a, 102b, 102c) of the vehicle system 100. Variable 'v' may represent a measured moving velocity of the vehicle system 100. And variable 'Δt' represents a measured amount or passage of time between the velocity difference peaks 302 (e.g., 302a, 302b, 302c). The route inspection device 120 may determine if the difference between the calculated (e.g., Δd) and measured distances between the wheels 102 of the vehicle system 100 is within a predetermined threshold. If the calculated and measured distances are within the predetermined threshold, the route inspection device 120 may determine that the velocity peaks 302 occurred at the same location of the route 101 and the route 101 is potentially damaged at said location.

$$\Delta t = \frac{\Delta d}{v} \quad \text{(Equation \#3)}$$

For example for Equation #3, may be used by the route inspection device 120 to compare the amount or passage of time between the velocity difference peaks 302 (e.g., 302a, 302b, 302c) with the amount of time between the velocity difference peaks 302 measured by the vehicle system 100. In an embodiment, variable 'Δt' may represent the calculated amount or passage of time between the velocity difference peaks 302 (e.g., 302a, 302b, 302c). Variable 'v' may represent a measured moving velocity of the vehicle system 100. And variable 'Δd' represents a measured distance between the wheels 102 (e.g., 102a, 102b, 102c) of the vehicle system 100. The route inspection device 120 may determine if the difference between the calculated (e.g., Δt) and measured times between the velocity difference peaks 302 is within a predetermined threshold. If the calculated and measured times are within the predetermined threshold, the route inspection device 120 may determine that the velocity peaks 302 occurred at the same location of the route 101 and the route 101 is potentially damaged at said location.

To ease the calculations for Equations #1, #2, and/or #3, the route inspection device 120 may use the velocity difference peak 302a from the wheel 102a as a reference point for the remaining wheels 102b and 102c.

For example for Equation #1, the displacement or distance, Δd, may be between the wheels 102a and 102b represented as a displacement 115 in FIG. 1. The displacement 115, corresponds to a distance that the wheel 102b travels in order to reach the same point of the route 101 the velocity difference peak 302a, measured at the wheel 102a, occurred. The route inspection device 120 may determine time stamps between the wheel creep peaks 302a at $t_0$ and 302b at $t_1$ resulting in a time delta, Δt, represented as 310 in FIG. 3. The time delta 310 may also represent the amount of time between the velocity difference peaks 302a and 302b.

The displacement 115 may be a fixed value stored on the memory device 105 allowing the route inspection device 120 to determine the displacement 115 by merely accessing, reading, or receiving the displacement 115 from the memory device 105. Additionally or alternatively, displacement 115 may be entered into the route inspection device 120 by the operator using the system interface 111. Optionally, the route inspection device 120 may receive the displacement 115 after being transmitted from an off-board system (e.g., a central dispatch facility, a scheduling system, an exchange server for a central database, or the like) by the communication device 140.

The route inspection device 120 may determine the time delta 310 by comparing $t_0$ and $t_1$ time stamps received by the monitor device 110. Additionally or alternatively, the route inspection device 120 may receive, acquire, or access the $t_0$ and $t_1$ time stamps through the timing device 108. Optionally, the route inspection device 120 may receive, acquire, or access the $t_0$ and $t_1$ time stamps through the memory device 105.

Once the displacement 115 and the time delta 310 are determined, the route inspection device 120 may use Equation #1 and divide the displacement 115 with the time delta 310 to determine the calculated velocity. Once the calculated velocity is determined the route inspection device 120 will compare the calculated velocity with the moving velocity of the vehicle system 100. If both values are within a determined non-zero velocity bandwidth, the route inspection device 120 may determine the velocity difference peaks 302a and 302b occurred at the same location of the route 101. The determined non-zero velocity bandwidth allows measurement inefficiencies within the vehicle system 100 to not affect the result (e.g., electrical signal noise, jitter, or the like). The route inspection device 120 may calculate several velocities using the known distances between the wheels 102 and the measured time periods between peaks associated with the wheels 102. If the calculated and moving velocities match (e.g., are the same or within a designated range of each other), then the route inspection device 120 determines that the peaks occurred when the wheels 102 traveled over the same location in the route 101 and that this location of the route 101 may be damaged. If the calculated and moving velocities do not match (e.g., are not the same or not within the designated range of each other), then the route inspection device 120 determines that the peaks did not occur when the wheels 102 traveled over the same location in the route 101 and that this location of the route 101 may not be damaged.

The route inspection device 120 may access, read, or receive the measured moving velocity of the vehicle system 100 from the speed meter 112 or the location determining device 130. Optionally, the route inspection device 120 may access, read, or receive the moving velocity of the vehicle system 100 from the monitor device 110 after the calculation of the velocity differences. Additionally or alternatively, the route inspection device 120 may access, read, or receive the moving velocity of the vehicle system 100 stored on the memory device 105. In an embodiment the moving velocity of the vehicle system 100 may be entered into the route inspection device 120 by the operator using the system interface 111. Additionally or alternatively, the route inspection device 120 may receive the moving velocity of the vehicle system 100 from a transmission by an off-board system (e.g., a central dispatch facility, a scheduling system, an exchange server for a central database, sensors along the route 101, or the like) through the communication device 140.

Figure 4:
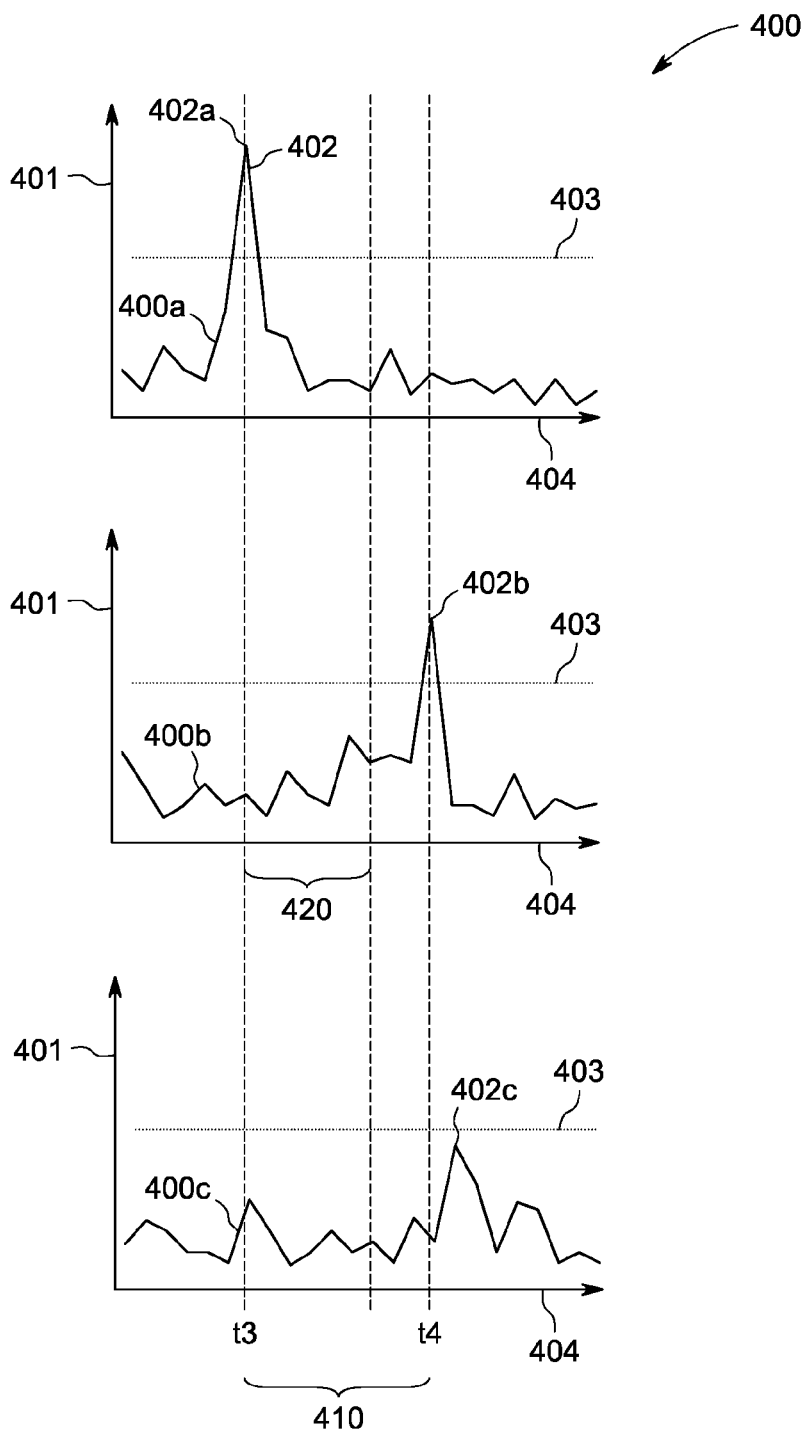
FIG. 4 is a graphical representation of wheel creep measurements from several wheels of the vehicle system shown in FIG. 1 traveling along a route.

FIG. 4 shows another set of velocity differences 400 of the vehicle system 100. The velocity differences 400 (e.g., 400a, 400b, 400c) represent differences between the angular velocities of three wheels 102 (e.g., 102a, 102b, 102c) of the vehicle system 100 and a moving velocity of the vehicle system 100. The velocity differences 400 are shown alongside horizontal axes 404, representative of time, and vertical axes 401 representative of the value, magnitude, or percentage of the velocity differences. The vehicle system 100 is traveling along the route 101 in the direction of the arrow 160 (shown in FIG. 1).

FIG. 4 shows velocity differences 400 of which the route inspection device 120 may determine that the route 101 is not potentially damaged. For example, the route inspection device 120 may use Equation #3 to determine a calculated time delta 420 in order to verify or determine whether velocity difference peaks 402a and 402b occurred at the same location of the route 101. The measured time delta 410 corresponds to the difference in time stamps, $t_3$ and $t_4$, between velocity difference peaks 402a and 402b. Since the calculated time delta 420 is less than the measured time delta 410, the route inspection device 120 may determine that the velocity difference peaks 402a and 402b did not occur at the same location of the route 101. Additionally or alternatively, the route inspection device 120 may use the designated non-zero threshold 403 to determine the velocity difference peak 402c was not caused by a potentially damaged section of the route 101.

Figure 5:
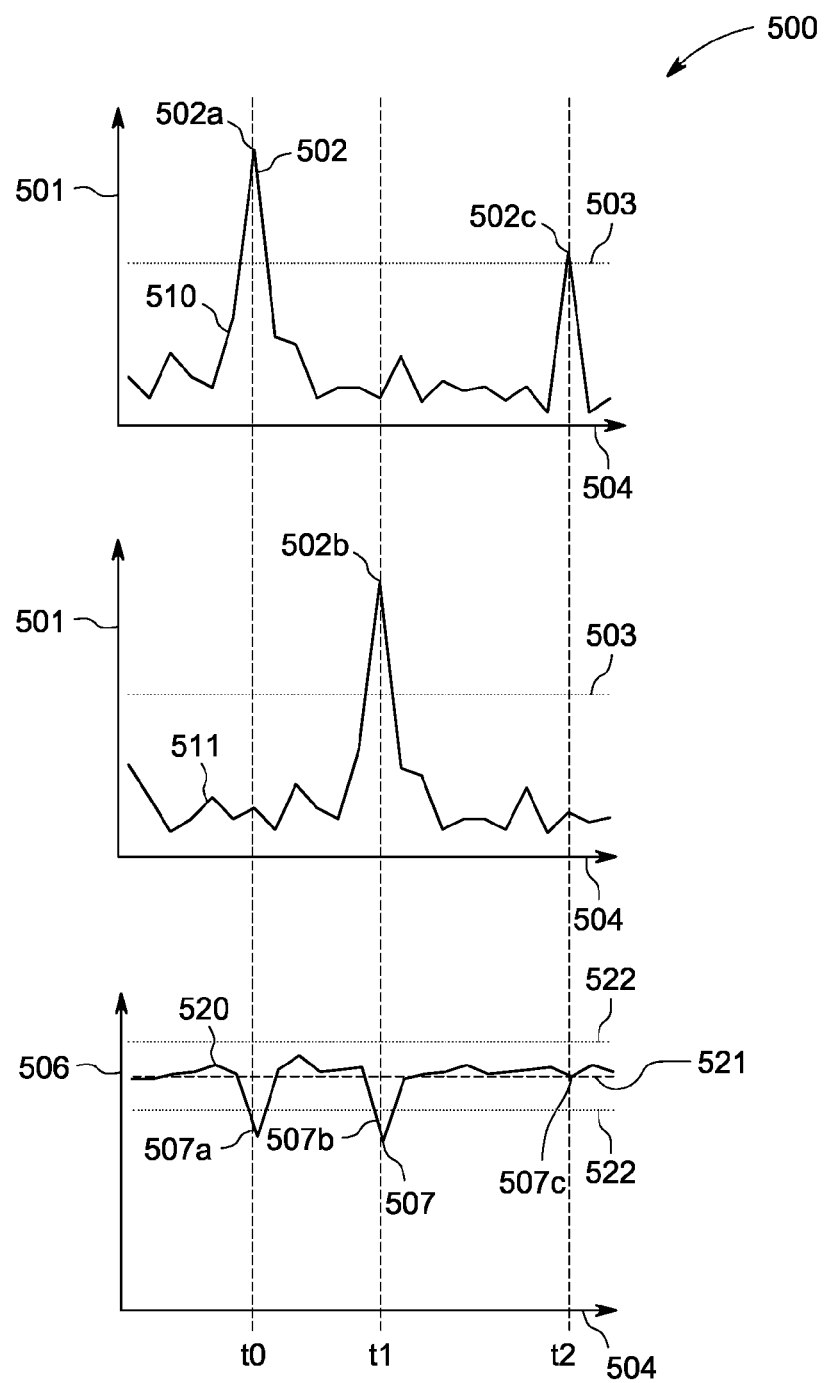
FIG. 5 is a graphical representation of wheel creep measurements from wheels within the vehicle system shown in FIG. 1 and vertical displacement measurements from an accelerometer sensor of the vehicle system as the vehicle system travels along a route.

Optionally, the route inspection device 120 may verify, authenticate, or certify a damaged section of the route 101 by comparing the velocity differences with measurements from the sensor 150 (e.g., accelerometer, optical sensor, acoustic sensor, microphone, electrical probe, or the like). FIG. 5 shows a set of velocity differences and sensor output 500 of the vehicle system 100. Optionally, the sensor 150 may comprise an accelerometer to measure a vertical displacement of the vehicle system 100. The velocity differences and sensor output 500 contains two graphs (510 and 511) representing differences between the angular velocities of two wheels 102 (e.g., 102a, 102b) in the vehicle system 100, and moving velocities of the vehicle system 100. The velocity differences and sensor output 500 contains a sensor output 520 of the sensor 150. The velocity differences and sensor output 500 are shown alongside horizontal axes 504 representative of time and vertical axes 501 representative of the value, magnitude, or percentage of the velocity differences and a separate vertical axis 506 representative of distance or displacement.

The route inspection device 120 may use the sensor output measurement 520 in conjunction with one or both of the velocity difference measurements 510 and/or 511 to confirm a measurement or determination of the route inspection device 120 of a damaged section of the route 101. For example, the route inspection device 120 may determine the time stamps corresponding to velocity differences caused by the damaged section of the route 101 by comparing the velocity differences to a determined non-zero threshold 503. The velocity difference measurements 510 and 511 have three velocity difference peaks 502 (e.g., 502a, 502b, 502c) greater than the determined non-zero threshold 503. The velocity difference peaks 502 occur at time stamps, $t_0$, $t_1$, and $t_2$. The route inspection device 120 may compare the velocity difference peaks 502 (e.g., 502a, 502b, 502c) to any variations, changes, peaks, or deviations of the sensor output 520 at the corresponding time stamp.

To determine such variations in the sensor output 520 the route inspection device 120 may apply a determined non-zero sensor bandwidth 522. Optionally, the determined non-zero sensor bandwidth 522 is a range of limits updated by a rolling average value 521 of the sensor output 520. The route inspection device 120 may determine that any sensor output 520 outside the determined non-zero sensor bandwidth 522 corresponds to a damaged section of the route 101. Additionally or alternatively, the route inspection device 120 may measure an extreme rate change or slope to correspond to the damaged section of the route 101. The sensor output 520 shows two bottom measurements 507 (e.g., 507a, 507b) outside the determined non-zero sensor bandwidth 522 occurring at $t_0$ and $t_1$. The route inspection device 120 may use the two bottom measurements 507 (e.g., 507a, 507b) to verify that the wheel creep peaks 502 (e.g., 502a, 502b) correspond to a damaged section of the route 101. Additionally or alternatively, the route inspection device 120 may determine the bottom measurement 507 (e.g., 507c) is within the determined non-zero sensor bandwidth 522. The route inspection device 120 may then conclude the wheel creep peak 502 at t2 (e.g., 502c) corresponding to the bottom measurement 507c is likely a false positive and does not represent a damaged section of the route 101.

Additionally or alternatively, the route inspection device 120 may use a determined non-zero acceleration threshold. Wherein the route inspection device 120 may only determine whether a section of the route 101 is damaged when an acceleration of the vehicle system 101 is below the determined non-zero acceleration threshold. The acceleration of the vehicle system 101 may be measured by the speed meter 112. Optionally, the acceleration of the vehicle system 101 may be measured by the location determining device 130.

In at least one embodiment, the route inspection device 120 may use the sensor 150 (e.g., accelerometer, optical sensors, gyroscope, or the like) to determine whether the damaged section of the route 101 is an engine burn segment. Engine burn is a progressive fracture in a rail that originates at spots where the wheels have slipped or spun. A damaged section of the rail may cause a rapid change in the vertical displacement of the vehicle system 100. The route inspection 120 may use the sensor 150 to determine if the potentially damaged section of the route 101 caused a change in the vertical displacement of the vehicle system 100.

Figure 6:
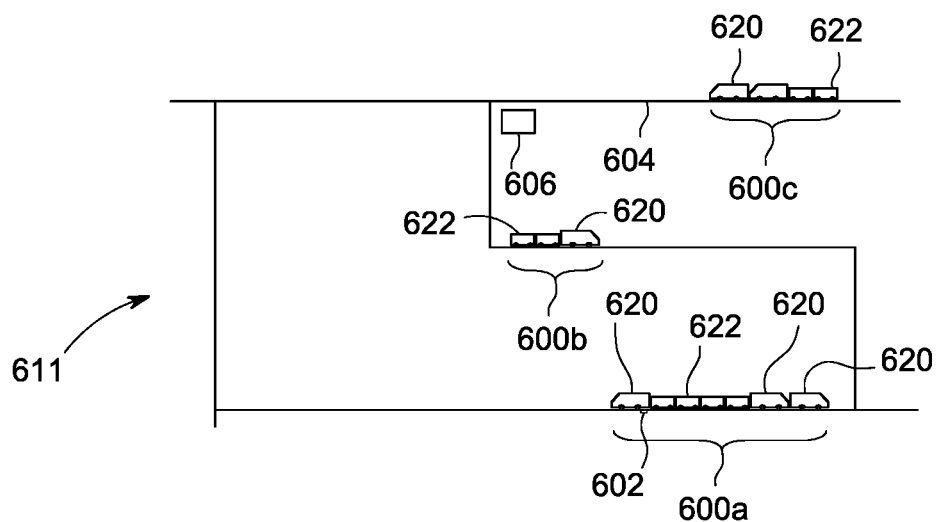
FIG. 6 is a schematic diagram of a transportation network of an embodiment.
Figure 7:
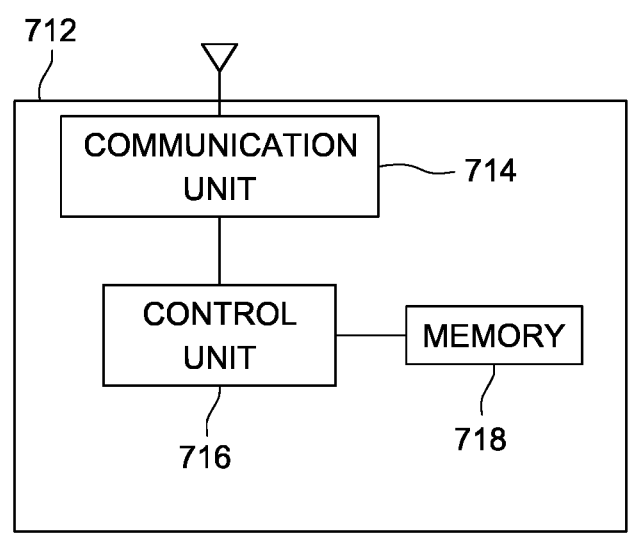
FIG. 7 is a schematic illustration of an embodiment of a control system of an off-board location, in accordance with an embodiment.

FIG. 6 illustrates a schematic diagram of a transportation network 611 traveled by one or more vehicle systems 600 (e.g., the same as or similar to the vehicle system 100 described above). The transportation network 611 includes a plurality of interconnected routes 604, such as railroad tracks, roads, or other paths across which the vehicle system 600 travels. The routes 604 may be referred to as main line routes when the routes 604 provide paths for the vehicle systems 600 to travel along in order to travel between a starting location and a destination location (and/or to one or more intermediate locations between the starting location and the destination location). The transportation network 611 may extend over a relatively large area, such as hundreds of square miles or kilometers of area. While only one transportation network 611 is shown in FIG. 6, one or more other transportation networks 611 may be joined with and accessible to vehicles traveling in the illustrated transportation network 611. For example, one or more of the routes 604 may extend to another transportation network 611 such that vehicles can travel between the transportation networks 611.

Different transportation networks 100 may be defined by different geographic boundaries, such as different towns, cities, counties, states, groups of states, countries, continents, or the like. The number of routes 604 shown in FIG. 6 is meant to be illustrative and not limiting on embodiments of the described subject matter. The vehicle systems 600 may concurrently travel within the transportation network 611 along the same or different routes 604. Travel of one or more vehicle systems 600 may be constrained to travel within the transportation network 611. Alternatively, one or more of the vehicle systems 600 may enter the transportation network 611 from another transportation network or leave the transportation network 611 to travel into another transportation network.

The vehicle systems 600 (e.g., 600a, 600b, 600c) are shown with one or more propulsion-generating vehicles 620 and/or one or more non-propulsion-generating vehicles 622. The vehicle systems 600 may be formed by mechanically coupling or linking together one or more of the propulsion-generating vehicles 620 and/or one or more non-propulsion-generating vehicles 622. It should be noted, that one or more of the vehicles (e.g., propulsion-generating vehicles 620, non-propulsion-generating vehicles 622) may include one or more of the components described above for the vehicle system 100.

The vehicle system 600 may be configured to communicate information of an identified location of a damaged section 602 of the route 604 on which the vehicle system 600 travels to one or more off-board locations, such as to a dispatch facility 606, and/or to one or more other vehicle systems 600 that are traveling along the route or that may travel along the route sometime in the future. For example, the vehicle system 600a has located a damaged section 602 of the route 604 using one or more of the methods described above. The vehicle system 600a transmits the identified location of the damage section 602 the dispatch facility 606, and to the vehicle systems 600b and 600c. It should be noted that the transportation network 611 may include one or more off-board locations (e.g., central dispatch facilities, exchange servers for a central database, a plurality of dispatch facilities, or the like).

Additionally or alternatively, the off-board location (e.g., the dispatch facility 606) may include a control system 712 (e.g., an off-board vehicle control and/or scheduling system, an off-board route inspection coordination control system, or the like). The control system 712 may comprise a communication unit 714, a control unit 716, and a memory device 718. The communication unit 714 and the memory device 718 are operably electrically coupled to the controller unit 716. The control system 712

The communication unit 714 may be configured to transmit and receive electronic communications from one or more vehicle systems 600, other off-board locations (e.g., other dispatch facilities 606), other transportation networks 611, or the like. The communication unit may be configured to transmit and receive electronic communications using a wired communication channel (e.g., electrical cables) and/or a wireless communication channel (e.g., one or more radio channels). For example, the communication unit 714 may be a data radio, other radio, a device that communicates using satellite or cellular wireless channels, or the like. Alternatively or additionally, the communication unit 714 may be configured to communicate with rail vehicles over a catenary line, third rail, track, or the like that are in electrical contact with the rail vehicles.

The control unit 716 controls or manages operations of the system 712 and may include or represent hardware circuits or circuitry that include and/or are connected with one or more logic based devices, such as one or more processors, microprocessors, controllers, microcontrollers, or other logic based devices (and/or associated hardware, circuitry, and/or software stored on a tangible and non-transitory computer readable medium or memory). The control unit 716 is configured to control the communication unit 614 for communicating with vehicle systems 600 travelling within the transportation network 611.

The memory device 718 of the system 712 may include or represent one or more memories (e.g., a tangible and non-transitory computer readable memory, such as a computer hard drive, EEPROM, ROM, RAM, or the like) having a table, list, database, or other memory structure used to store information used in conjunction with performing one or more of the methods described herein.

In at least one embodiment, the system 712 is configured to communicate (e.g., automatically communicate) one or more control signals (e.g., instructions) to one or more of the vehicle systems 600 responsive to receiving information of the location of a damaged section of route 604. The one or more control signals may comprise a slow order that requires the one or more vehicles to travel no faster than a designated speed, which may be a speed that is slower than a designated speed limit or trip plan at the location when no slow orders are in effect. For example, the vehicle system 600 may be configured to operate according to the slow order only when the vehicle systems 600 reach and/or are within a designated distance threshold of the location (e.g., when a vehicle system is one kilometer from the location) the vehicle operates according to the slow order. The control signals be store on the memory 718.

The system 712 may be configured to determine which vehicle system 600 (e.g., 600a, 600b, 600c) to communicate the signal(s) to (such vehicle system 600 being a subset of fewer than all of the vehicle systems 600 within the transportation network 611). For example, the system 712 may determine which vehicle systems 600 to communicate with based at least in part on which vehicle systems 600 are planned/scheduled to travel past the identified location (e.g., the damaged section 602) along the route 604.

Alternatively or additionally, the one or more control signals may comprise inspection control signals. The inspection control signals may be used to control the vehicle system(s) 600 (which the inspection control signals are communicated to) to enter into one or more modes of operation for inspecting the identified location (e.g., damaged section 602) of the route 604. For example, the system 712 may have received electronic communication from vehicle system 600a identifying the damaged section 602 of the route 604. The memory device 718 have include a vehicle system database of the vehicle systems 600 within the transportation network 611 or in communication with the system 712. The vehicle system database may include information on which vehicle system 600 will be travelling through the damaged section 602. Based on the vehicle system database, the system 712 communicates the inspection control signal to the vehicle system 600b, which is scheduled to subsequently (after the vehicle system 600a) travel over or past the damaged section 602. Once the inspection control signal is received by the vehicle system 600b, the control system (e.g., the control system 109) of the vehicle system 600b may configure the vehicle system 600b to enter a mode of operation based on the received inspection signal. For example, the vehicle system 600b may be configured to slow down or speed up (as applicable based on a current moving velocity of the vehicle system 600b) to the speed of travel over the route 604 that is designated for carrying out wheel creep detection as described herein.

Alternatively or additionally, if a vehicle system 600 is outfitted with one or more inspection systems for inspecting routes other than (or in addition to) through wheel creep detection (e.g., video inspection), see below, the vehicle may be configured to enter a mode of operation based on the received inspection control signals for activating the inspection system(s) ahead of, or at, the damaged section for 602.

The system 712 may be configured to communicate the control signals (e.g., select which vehicle systems 600 to communicate the control signals to, and/or select which control signals to communicate, and/or configure the control signals that are to be communicated) based on one or more current operating modes of the vehicle systems 600, schedules of the vehicle systems 600, operational designations of the vehicle systems 600 (e.g., "express" vehicles, relative priority level, or the like), current or projected route 604 conditions, or the like.

For example, the vehicle system 600a is assigned a trip plan that designates a designated schedule of the vehicle system 600a (e.g., time of departure, time of arrival). If the vehicle system 600a is operating behind the designated schedule of the vehicle (i.e., not operating on time) at a time when it reaches the damaged section 602, and/or if the vehicle system 600a is operating as a designated "express" vehicle (e.g., the vehicle system 600a has priority of speed and/or travel relative to other vehicle systems 600 (e.g., 600b, 600c)), and/or if slowing the vehicle system 600a to a particular level of speed would interfere with subsequent vehicle systems 600 to an extent above a designated tolerance threshold (e.g., causing the subsequent vehicle to fall "N" minutes behind schedule is permissible, but not "M" minutes, where "M" and "N" are designated numerical values and M is greater than N), the system 712 may be configured to communicate control signals to the vehicle system 600a responsive to which the vehicle system 600a travels no faster than a designated "slow order" speed past the damages section 602, but does not decelerate to a speed, slower than the slow order speed, to secondarily inspect the route 604 at the damaged section 602 and communicate inspection information back to the system for 712.

In another example, if a vehicle system 600 lacks an on-board system for route inspection, the system 712 may be configured, based on knowledge of the vehicle system 600 configuration stored on the memory device 718, to communicate control signals to the vehicle system 600 responsive to which the vehicle system 600 travels no faster than a designated slow order speed past the damaged section 602, but does not decelerate to a speed, slower than the slow order speed, to secondarily inspect the route at the damaged section 602 and communicate inspection information back to the system 712. Conversely, if a vehicle system 600 includes an on-board inspection system, is not behind schedule, and is not operating in a designated priority or express mode, the system 712 may be configured to communicate control signals to the vehicle system 600 responsive to which the vehicle system 600 decelerates to a designated speed or speed range for carrying out a secondary route inspection.

In at least one embodiment, the system 612 may be configured to generate and communicate control signals to vehicle systems 600, or to take other actions (e.g., adjust the trip plan of one or more of the vehicle systems 600) based on information of a location received from multiple vehicle systems 600 (e.g., 600a, 600b, 600c) over time and/or from the same vehicle system 600 passing over or past the damaged sections 602 in multiple instances. For example, the system 612 may be configured to generate control signals for issuing a slow order (responsive to which vehicle systems 600 to which the signals are communicated to travel no more than a designated speed) at the damaged section 602, or control signals responsive to which a vehicle system 600 slows to carry out a secondary route inspection at the damaged section 602, or control signals to schedule route repair or manual inspection or the like, only if route damage at the damaged section 602 has been identified two or more times (e.g., twice by the same vehicle system 600 at different times, or twice by two vehicle systems 600 at different times).

Although embodiments are illustrated herein relating to vehicle systems 600 being configured to identify damaged sections (e.g., the damaged section 602) of the route 602 based on determined wheel creep or the like, the system 612 may be configured to operate (as described above) based on locations of damaged sections 602 of the route 604 that are identified by vehicle systems 600 using other means, such as electrical inspection (e.g., identifying route damage by analyzing electrical signals propagated through a track), video inspection (e.g., identifying route damage by analyzing video images sensed of a track, track vicinity, or other route), light inspection (e.g., identifying route damage by analyzing reflected laser light emitted towards a rail or other route), or the like.

In one example of the inventive subject matter, a method includes determining, using one or more processors, a first velocity difference between a moving speed of a vehicle traveling along a route 101 in the first rotational speed of the first wheel (e.g. the wheel 102) of the vehicle traveling along the route 101. The method includes identifying, using the one or more processors, a damaged section of the route 101 based at least in part on the first velocity difference the first wheel.

In one aspect, the method may further include determining, using the one or more processors, at least a second velocity difference between the moving speed of the vehicle and at least a second rotational speed of at least a second wheel (e.g., the wheel 102) of the vehicle. The damaged section of the route 101 is identified based at least in part on the first velocity difference and the at least a second velocity difference. Optionally, the damage section of the method is identified by correlating times of when each of the first velocity difference in the at least a second velocity difference occurs with the moving speed of the vehicle. Optionally, the vehicle of the method may comprise a rail vehicle having a first traction motor that rotates the first wheel and at least a second traction motor that rotates the at least a second wheel.

In one aspect, the first velocity difference of the method is a wheel creep of the first wheel.

In one aspect, the damaged section of the route 101 is identified by the method in response to the first velocity difference exceeding a designated, non-zero threshold.

In one aspect, the first velocity difference is only determined by the method when an acceleration of the vehicle is less than a designated, non-zero acceleration threshold.

In one aspect, the method includes verifying, using the one or more processors, identification of the damage section of the route 101 using data other than the first velocity difference. Optionally, the identification of the damage section of the route 101 is verified by at least one of monitoring vertical displacement of the vehicle, and optical monitoring system disposed on board the vehicle, injecting a logical signal into the route 101 at a first location on the vehicle on one side of the damaged section in measuring one or more electrical characteristics of the route 101 and a second location along the vehicle on an opposite side of the damage section, or acoustically detecting one or more residual sounds using an acoustic pickup device disposed on board the vehicle.

For example, the damaged section of the route 101 is verified by the route inspection device 120 by comparing an electrical signal injected by the sensor 150 into the route 101 at a first location along the vehicle system 100 on one side of the damaged section and measuring one or more electrical characteristics of the route 101 at a second location along the vehicle system 100 on an opposite side of the damaged section.

In another example, the damaged section of the route 101 is verified by the route inspection device 120 by detecting an acoustical signal transmitted by the sensor 150 for one or more residual sounds using an acoustic pickup device disposed onboard the vehicle. The one or more residual sounds may be residual noises that occur during travel and operation of the vehicle system 100. The residual sounds may be created by the movement of the wheels 102 of the vehicle system 100 along the route 101 (e.g., rails of a track, road, ground, or the like), operation of a prime mover (e.g., engine and/or generator/alternator) of the vehicle system 100, operation of the motor 104 of the vehicle system 100, or the like.

In one aspect, the method may include determining, using the one or more processors, a location in the damage section of the route 101 and reporting a location of the damage section to an off-board location (e.g., a central dispatch facility, a scheduling system, an exchange server for a central database, or the like). Optionally the off-board location comprises a dispatch facility, and reporting the location of the damage section comprises instructions to the dispatch facility to at least one of schedule inspection of the damaged section of the round 101, schedule repair the damage section of Route 101, modify a schedule of one or more other vehicles, or notify the one or more other vehicles of the damage section of the route 101. Optionally, the reporting of the location comprises indicating the location the damage section of the route 10121 or more other vehicles currently traveling on the route 101 response to the damage section the route 101 being identified.

In one aspect, the method may include automatically slowing or automatically stopping movement of the vehicle in response to the damaged of the route 101 being identified.

In one aspect, the first velocity difference may be calculated by the method from a data output from one or more tachometers disposed onboard the vehicle and using circuitry disposed onboard the vehicle.

In one aspect, the method may include assigning a priority to the potentially damaged section of the route 101 based on the magnitude of the wheel creep measured by the monitor device 110. Optionally, the priority may be transmitted to an off-board system by the communication device 140. Optionally, the vehicle system 100 may assign a priority based on measurements of the sensor 150 (e.g., accelerometer, optical sensor, electrical probe, gyroscope, or the like).

In one example of the inventive subject matter, a system includes a creep monitoring device configured to determine a first velocity difference between a moving speed of a vehicle traveling along a route 101 and a first rotational speed of a first wheel of the vehicle traveling along the route 101.

In one example of the inventive subject matter, a method includes monitoring wheel creeps for a plurality of wheels of a vehicle as the vehicle travels along a route 101. The method includes examining the wheel creeps to determine when the wheel creeps exceed a designated, non-zero threshold, and determining if the wheel creeps exceed the threshold when the corresponding wheels traveled over a common location along the route 101. The method includes identifying a damaged section of the route 101 at the common location when the wheel creeps exceed the non-zero threshold.

As used herein, the terms "module", "system," "device," or "unit," may include a hardware and/or software system and circuitry that operates to perform one or more functions. For example, a module, unit, device, or system may include a computer processor, controller, or other logic-based device that performs operations based on instructions stored on a tangible and non-transitory computer readable storage medium, such as a computer memory. Alternatively, a module, unit, device, or system may include a hard-wired device that performs operations based on hard-wired logic and circuitry of the device. The modules, units, or systems shown in the attached figures may represent the hardware and circuitry that operates based on software or hardwired instructions, the software that directs hardware to perform the operations, or a combination thereof. The modules, systems, devices, or units can include or represent hardware circuits or circuitry that include and/or are connected with one or more processors, such as one or computer microprocessors.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

One or more of the operations described above in connection with the methods may be performed using one or more processors. The different devices in the systems described herein may represent one or more processors, and two or more of these devices may include at least one of the same processors. In one embodiment, the operations described herein may represent actions performed when one or more processors (e.g., of the devices described herein) are hardwired to perform the methods or portions of the methods described herein, and/or when the processors (e.g., of the devices described herein) operate according to one or more software programs that are written by one or more persons of ordinary skill in the art to perform the operations described in connection with the methods.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

The invention claimed is:

1. A method comprising:
   determining, using one or more processors configured to receive data from an angular speed device and a speed meter, a first velocity difference between a moving speed of a vehicle traveling along a route and a first rotational speed of a first wheel of the vehicle traveling along the route; and
   identifying, using the one or more processors, a damaged section of the route based at least in part on the first velocity difference of the first wheel.

2. The method of claim 1, further comprising determining, using the one or more processors, at least a second velocity difference between the moving speed of the vehicle and at least a second rotational speed of at least a second wheel of the vehicle, wherein the damaged section of the route is identified based at least in part on the first velocity difference and the at least a second velocity difference.

3. The method of claim 2, wherein the damaged section is identified by correlating times of when each of the first velocity difference and the at least a second velocity difference occurs with the moving speed of the vehicle.

4. The method of claim 2, wherein the vehicle comprises a rail vehicle having a first traction motor that rotates the first wheel and at least a second traction motor that rotates the at least a second wheel.

5. The method of claim 1, further comprising determining, using the one or more processors, at least a second velocity difference between the moving speed of the vehicle and at least a second rotational speed of at least a second wheel of the vehicle when the damaged section of the route is identified.

6. The method of claim 1, wherein the damaged section of the route is identified responsive to the first velocity difference exceeding a designated, non-zero threshold.

7. The method of claim 1, wherein the first velocity difference is only determined when an acceleration of the vehicle is less than a designated, non-zero acceleration threshold.

8. The method of claim 1, further comprising verifying, using the one or more processors, identification of the damaged section of the route using data other than the first velocity difference.

9. The method of claim 8, wherein the identification of the damaged section of the route is verified by at least one of monitoring vertical displacement of the vehicle, an optical monitoring system disposed onboard the vehicle, injecting an electric signal into the route at a first location along the vehicle on one side of the damaged section and measuring one or more electrical characteristics of the route at a second location along the vehicle on an opposite side of the damaged section, or acoustically detecting one or more residual sounds using an acoustic pickup device disposed onboard the vehicle.

10. The method of claim 1, further comprising, using the one or more processors, determining a location of the damaged section of the route and reporting a location of the damaged section to an off-board location.

11. The method of claim 10, wherein the off-board location comprises a dispatch facility, and reporting the location of the damaged section comprises instructions to the dispatch facility to at least one of:
    schedule inspection of the damaged section of the route;
    schedule repair of the damaged section of the route;
    modify a schedule of one or more other vehicles; or
    notify the one or more other vehicles of the damaged section of the route.

12. The method of claim 10, wherein reporting the location comprises communicating the location of the damaged section of the route to one or more other vehicles concurrently traveling on the route responsive to the damaged section of the route being identified.

13. The method of claim 1, further comprising at least one of automatically slowing or automatically stopping movement of the vehicle responsive to the damaged section of the route being identified.

14. A system comprising:
    a creep monitoring device having one or more processors, wherein the creep monitoring device is configured to determine a first velocity difference between a moving speed of a vehicle traveling along a route and a first rotational speed of a first wheel of the vehicle traveling along the route; and
    a route inspection device having one or more processors, wherein the route inspection device is configured to identify a damaged section of the route based at least in part on the first velocity difference of the first wheel.

15. The system of claim 14, wherein the creep monitoring device is configured to determine at least a second velocity difference between the moving speed of the vehicle traveling along the route and at least a second rotational speed of at least a second wheel of the vehicle, and wherein the route inspection device is configured to identify the damaged section of the route based at least in part on the first velocity difference and the at least a second velocity difference.

16. The system of claim 14, wherein the route inspection device is configured to identify the damaged section of the route by at least one of: compare a designated non-zero threshold with the first velocity difference, or when an acceleration of the vehicle is less than a designated, non-zero acceleration threshold.

17. The system of claim 14, wherein the route inspection device is configured to report a location of the damaged section to an off-board location.

18. The system of claim 14, wherein the off-board location is a dispatch facility, wherein the reporting the location of the damaged section includes instructions to the dispatch facility to at least one of:
  schedule inspection of the damaged section of the route;
  schedule repair of the damaged section of the route;
  modify a schedule of one or more other vehicles; or
  notify the one or more other vehicles of the damaged section of the route.

19. The system of claim 18, wherein the off-board location is one or more other vehicles concurrently traveling on the route.

20. The system of claim 18 further comprising a control system at the off-board location, wherein the control system comprises a communication unit configured to receive from the vehicle the location of the damaged section that is identified and a control unit operably connected to the communication unit, the control unit is configured to control the communication unit to communicate control signals for controlling at least one of the vehicle or one or more other vehicles based at least in part on the location of the damaged section received from the vehicle.

21. The system of claim 14, wherein the route inspection device is configured to control at least one of automatically slowing or automatically stopping movement of the vehicle after identifying the damaged section of the route.

22. A method comprising:
  monitoring via data from an angular speed device and a speed meter wheel creeps for a plurality of wheels of a vehicle as the vehicle travels along a route;
  examining the wheel creeps to determine when the wheel creeps exceed a designated, non-zero threshold;
  determining if the wheel creeps exceed the non-zero threshold when the corresponding wheels traveled over a common location along the route; and
  identifying a damaged section of the route at the common location when the wheel creeps exceed the non-zero threshold.

* * * * *